(12) United States Patent
Gniadek et al.

(10) Patent No.: US 11,092,751 B2
(45) Date of Patent: Aug. 17, 2021

(54) STACKABLE ADAPTER HOUSING FOR OPPOSING MT FERRULES

(71) Applicant: Senko Advanced Components Inc, Marlborough, MA (US)

(72) Inventors: Jeffrey Gniadek, Oxford, ME (US); Takuya Ninomiya, Natick, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/577,197

(22) Filed: Sep. 20, 2019

(65) Prior Publication Data
US 2020/0096707 A1    Mar. 26, 2020

Related U.S. Application Data (60) Provisional application No. 62/733,945, filed on Sep. 20, 2018.

(51) Int. Cl.
*G02B 6/38* (2006.01)

(52) U.S. Cl.
CPC .......... *G02B 6/3825* (2013.01); *G02B 6/389* (2013.01); *G02B 6/3821* (2013.01); *G02B 6/3839* (2013.01); *G02B 6/3869* (2013.01); *G02B 6/3874* (2013.01); *G02B 6/3882* (2013.01); *G02B 6/3897* (2013.01)

(58) Field of Classification Search
CPC ... G02B 6/3821; G02B 6/3825; G02B 6/3839
See application file for complete search history.

(56) References Cited

U.S. PATENT DOCUMENTS

| | | | |
|---|---|---|---|
| 6,712,523 B2 | 3/2004 | Zimmel | |
| RE40,622 E | 1/2009 | Liang-Ju | |
| 8,845,205 B2 | 9/2014 | Nelson | |
| 9,383,527 B2* | 7/2016 | Ware | G02B 6/387 |
| 2003/0179993 A1* | 9/2003 | Shigenaga | G02B 6/3885 385/33 |
| 2004/0189321 A1* | 9/2004 | Drexler | G02B 6/3807 324/538 |
| 2005/0135755 A1* | 6/2005 | Kiani | G02B 6/3869 385/78 |
| 2006/0067628 A1* | 3/2006 | Suzuki | G02B 6/3885 385/60 |
| 2012/0121222 A1* | 5/2012 | Castonguay | G02B 6/3887 385/78 |
| 2012/0251864 A1* | 10/2012 | Blaha | H05K 3/301 429/100 |
| 2015/0205060 A1 | 7/2015 | Chen et al. | |
| 2016/0091670 A1* | 3/2016 | Akieda | G02B 6/4284 385/78 |
| 2016/0124160 A1* | 5/2016 | Verheyden | G02B 6/3869 385/56 |
| 2017/0212316 A1 | 7/2017 | Kazuyoshi et al. | |

(Continued)

OTHER PUBLICATIONS

International Search Report and Written Opinion; Application No. PCT/US19/52128, dated Dec. 11, 2019, pp. 11.

*Primary Examiner* — Eric Wong
(74) *Attorney, Agent, or Firm* — Stinson LLP (57) ABSTRACT

A fiber optic adapter for mating an opposing MT ferrule connectors. An adapter housing formed from a top and bottom portion holds a pair of opposing MT ferrules. The adapter housing is stackable on its vertical side.

10 Claims, 9 Drawing Sheets

(56) References Cited

U.S. PATENT DOCUMENTS

2017/0227718 A1\* 8/2017 Akieda ................ G02B 6/3821
2017/0276887 A1   9/2017 Wayne
2020/0110224 A1\* 4/2020 Chang ................. G02B 6/3831

\* cited by examiner

STACKABLE ADAPTER HOUSING FOR OPPOSING MT FERRULES

CROSS-REFERENCES TO RELATED APPLICATIONS

This application claims priority to provisional U.S. Pat. Application 62/733,945 filed on Sep. 20, 2018, "Stackable Adapter Housing for Opposing MT Ferrules", which is incorporated by reference into this application.

FIELD OF THE INVENTION

The present invention relates to fiber optic connectors and adapters, and more particularly, to fiber optic adapters and clip for mating opposing mechanical transfer ferrules.

BACKGROUND OF THE INVENTION

Modern high capacity optical systems often utilize fiber optic ribbons for inter-system connection. As there are multiple connection points in an optical path, there are needs for mating two fiber optic ferrules or a ferrule to another connector. In the mating of two fiber optic ferrules or a ferrule and a connector, the mechanical and optical alignment is paramount. Slight misalignment can result in significant signal loss, especially in the case of ferrules and connectors for multi-fiber optic ribbons and cables. Therefore, there is a need for an adapter that can hold and secure two fiber optic ferrules or a ferrule and a connector in alignment with precision. The adapter design should also allow that installation of the ferrules and connectors that is easy enough for in-field assembly. Further, the adapter should be durable in design and/or material for repeated installations and uninstallations.

SUMMARY OF THE INVENTION

According to the present invention, a fiber optic adapter with a bottom portion and a top portion secures opposing MT ferrules. The MT ferrule adapter has a top and bottom portion. The bottom portion has a pair of legs that attached or secure the adapter to a PCB or printed circuit board. The top portion secures to pair of retention wings and convers the opposing MT ferrules. The top portion has a stopper or lip at one end to prevent inadvertent removal of a MT ferrule from the adapter housing.

The MT Ferrule Adapter top and bottom portion are configured to allowing stacking of adapters vertically to take advantage of unused space, while reducing PCB space needed.

BRIEF DESCRIPTION OF THE DRAWINGS

Embodiments of the invention are described in more detail hereinafter with reference to the drawings, in which.

DETAILED DESCRIPTION

In the following description, apparatuses for mating opposing multi-fiber MT optic connectors. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
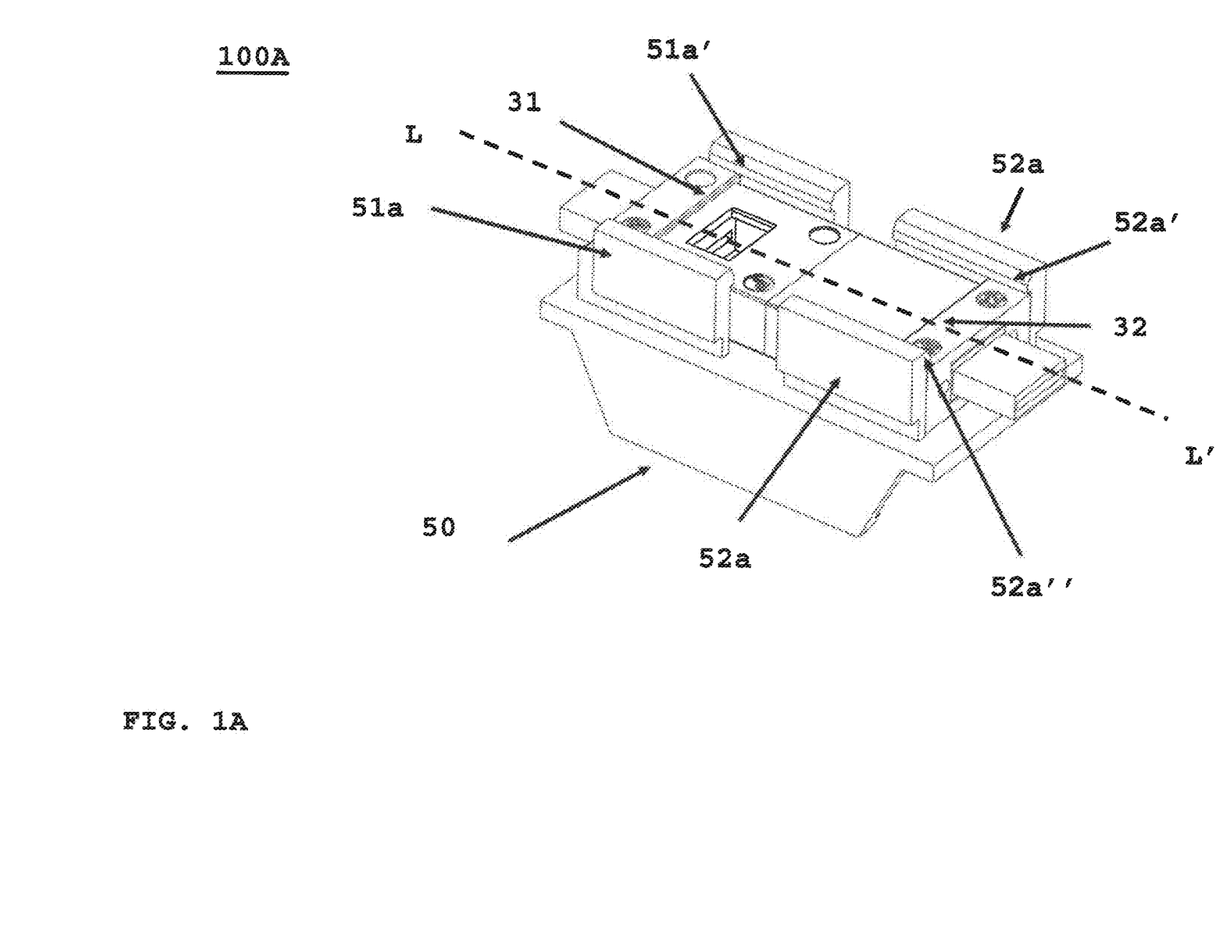
FIG. 1A depicts a fiber optic MT adapter with a plural of receptacles on either side each capable of accepting and securing a MT ferrule therein

FIG. 1A depicts MT Ferrule adapter (100A) comprising a bottom portion (50), retention wings (51a, 52a) for securing a top portion (10) to bottom portion, and to hold MT ferrules (31, 32) oppose of each other. MT means mechanical transfer ferrule. Each wing (51a, 52a) terminates in lip (51a', 51a" (FIG. 2), 52a', 52a"). When the retention wings are secured or attached to the bottom portion, opposing lips (52a', 52a") forms channel (55) (FIG. 2) therebetween that holds a MT ferrule. A set of opposing pair of retention wings are formed or attached to the top portion along a longitudinal axis L-L' of the adapter, as shown in FIG. 1A.

Figure 1B:
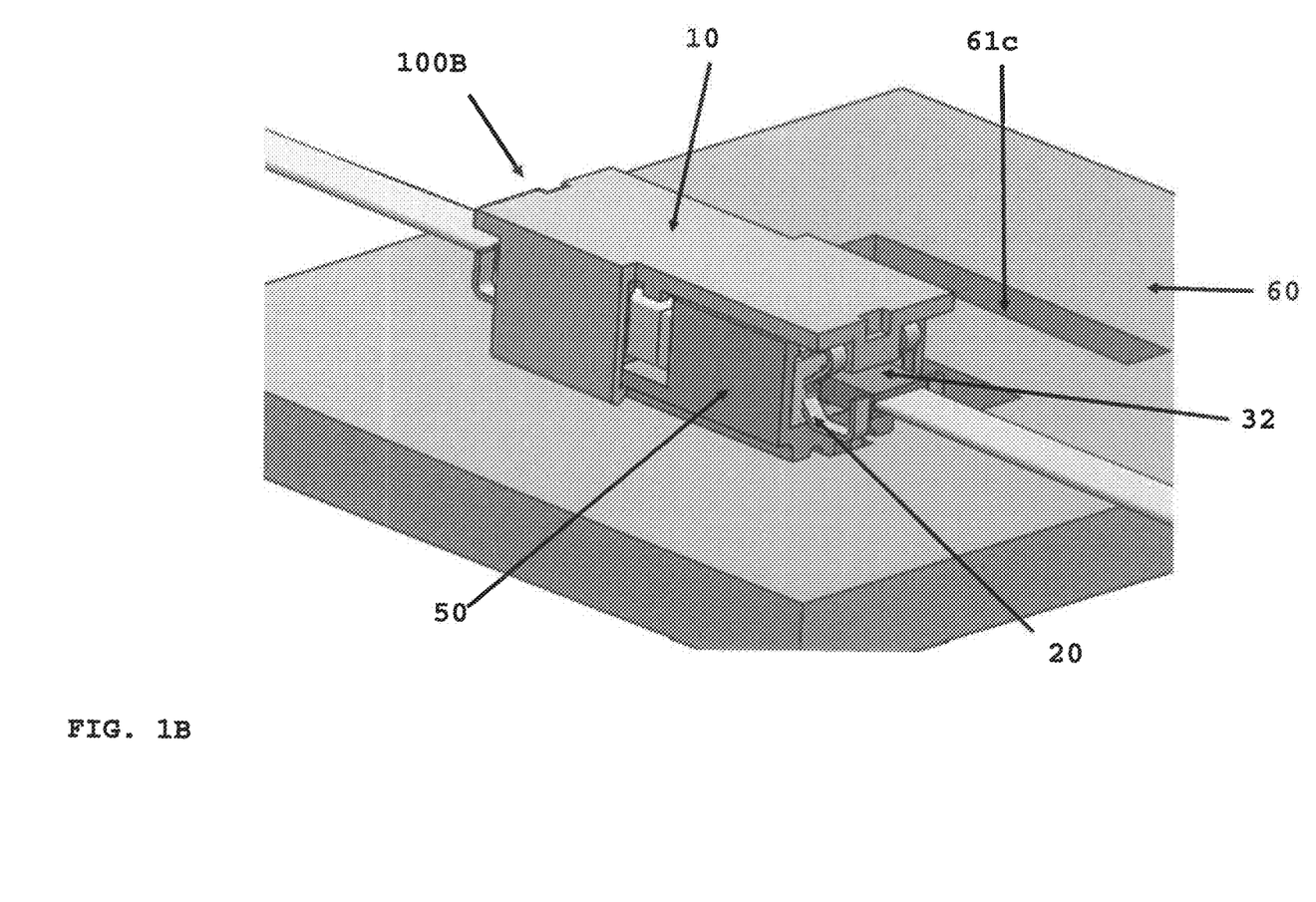
FIG. 1B is an assembled view of a second embodiment of the MT ferrule adapter attached to a PCB.

FIG. 1B depicts a second embodiment of MT Ferrule adapter (100B) secured to PCB (60) via slot (61a-61c) formed within PCB (60).

Figure 2:
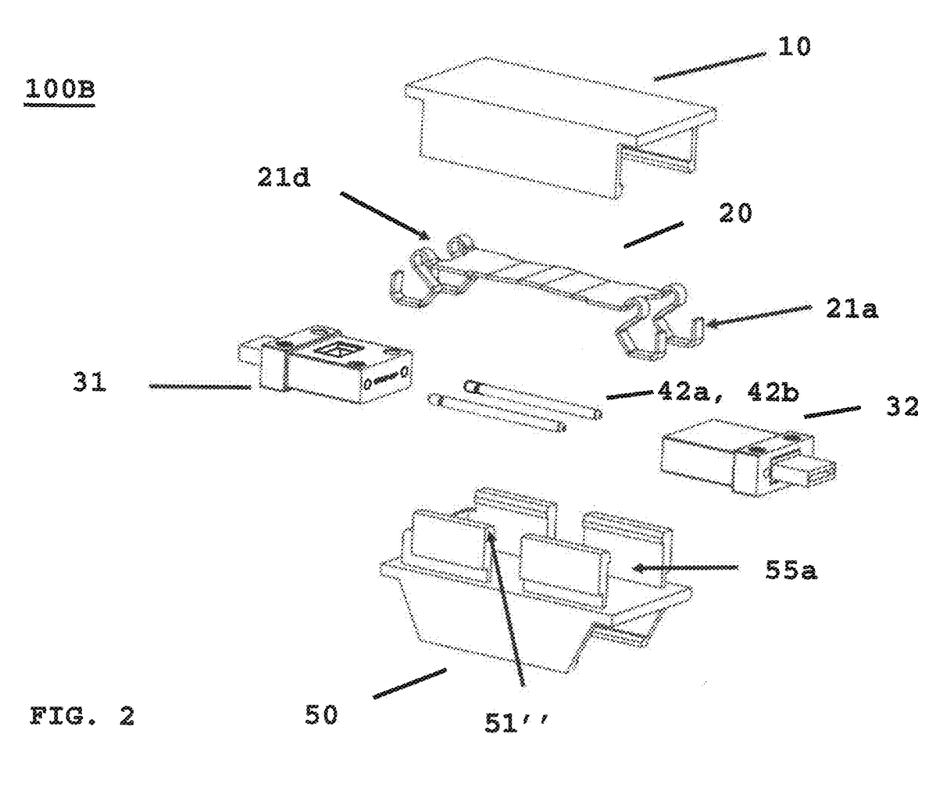
FIG. 2 is an exploded view of the MT ferrule adapter of FIG. 1B (PCB not shown)

FIG. 2 is an exploded view of MT Ferrule adapter (100B) having a top portion (10) with a pair of clips (11a, 11b) offset from one another. Top portion (10) has a stopper (70) that prevents MT ferrule (31 or 32) from being removed from adapter (100B) along longitudinally L-L'. Stopper (70) is generally lip structure. A MT-MT clip further secures opposing MT ferrules within adapter (100B). A pair of guide pins (42a, 42b) align opposing MT ferrules (31, 32). A bottom portion (50) or bottom cover (50) accepts MT ferrule (31, 32) in a channel (55) formed by ferrule retention portions (53a-53d). A pair of flexible boot clips (54a, 54b) are inserted into PCB slot 61a to secure MT Ferrule adapter to PCB (60).

Figures 3A, 3B:
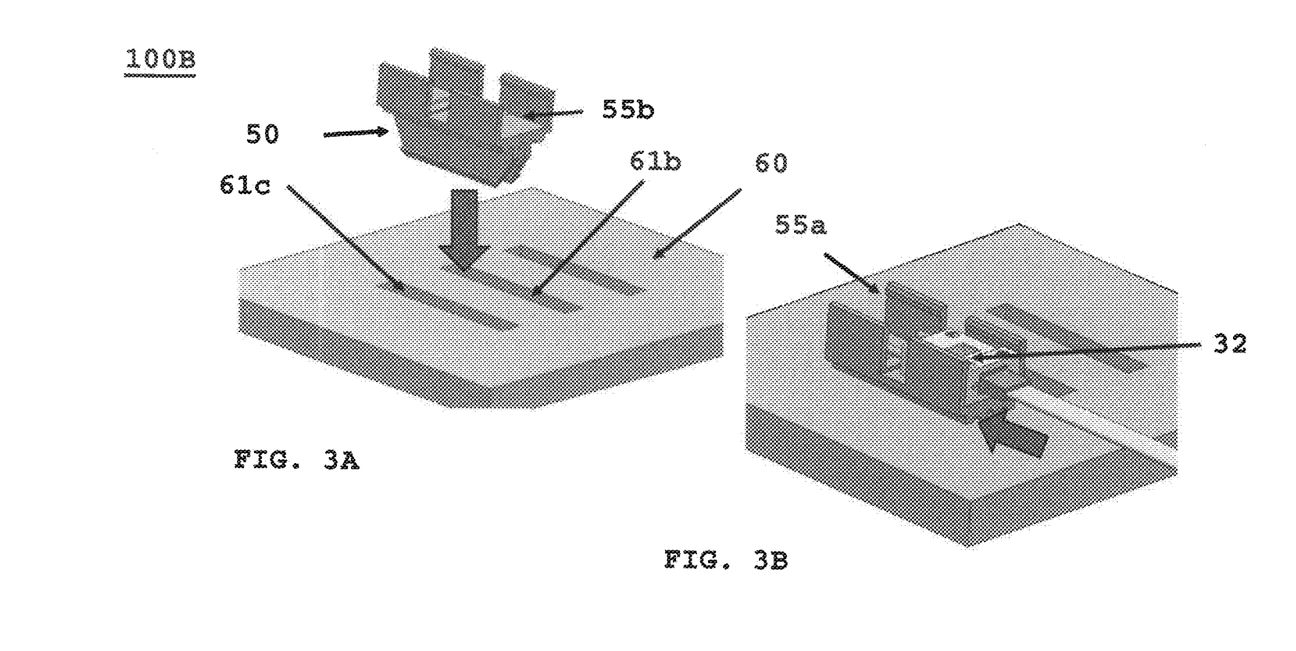
FIGS. 3A-3F depict the assembly steps of a MT adapter secured to a PCB.
Figure 3C:
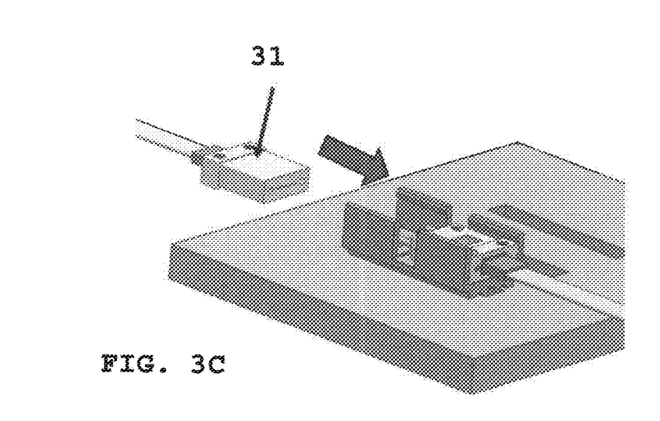
Figure 3D:
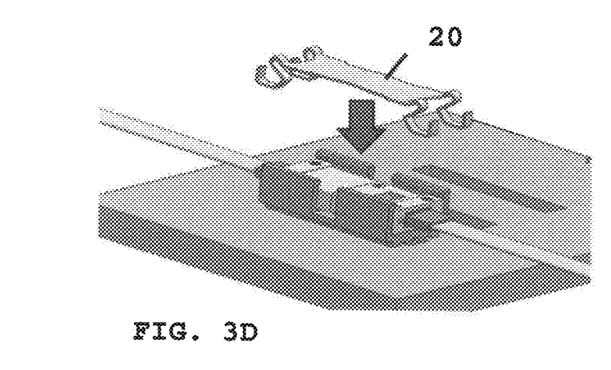
Figure 3E:
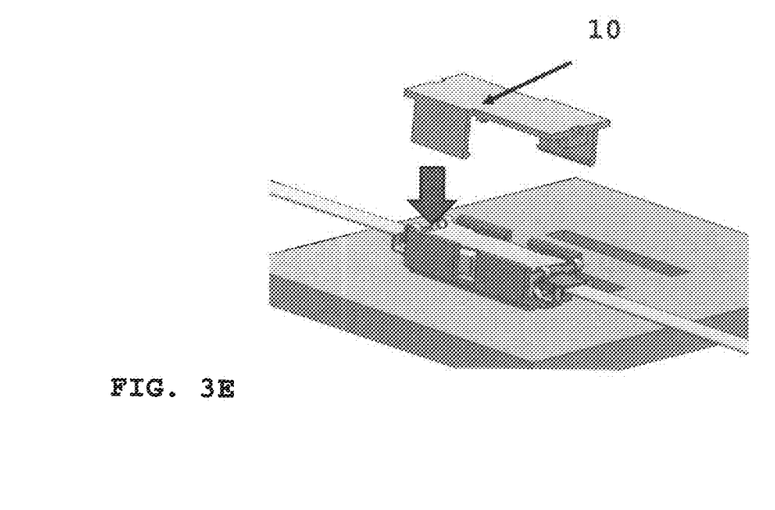
Figure 3F:
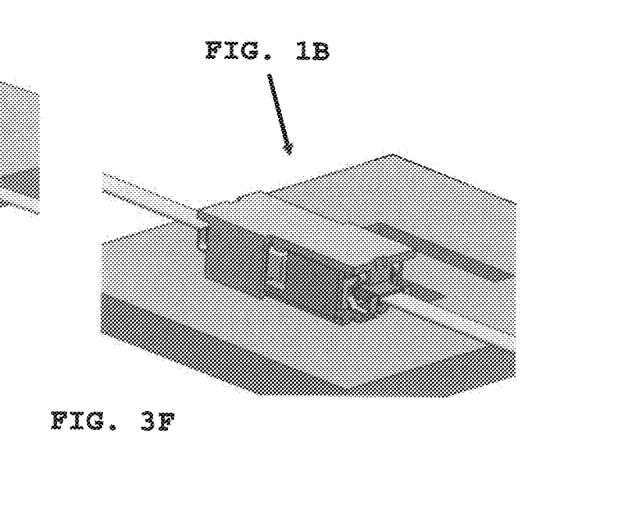

FIG. 3A depicts installing the bottom portion (50) as the first step in final assembly (FIG. 1B) of the MT Ferrule adapter (100b). Step 1 is inserting bottom portion (50) into slot 61b. FIG. 3B depicts inserting first ferrule 32 into channel 55a at Step 2. FIG. 3C depicts second ferrule 31 is inserted in second channel 55b. FIG. 3D depicts securing opposing MT ferrules with a MT-MT retention clip (20) at Step 4. Clip (20) snaps or clips over each opposing MT ferrule to secured the opposing, mated MT ferrules (31, 32) within their corresponding channel (55a, 55b). The retention clip (20) has spring arms (21a), 21(d) that engage the MT ferrules (31, 32). FIG. 3E depicts installing upper portion (10) to lower bottom portion (50), which secures retention clip 20 at Step 5. FIG. 3F is a MT Ferrule Adapter with opposing MT ferrules installed and secured onto PCB (60) as a final assembly at Step 6.

Figure 4A:
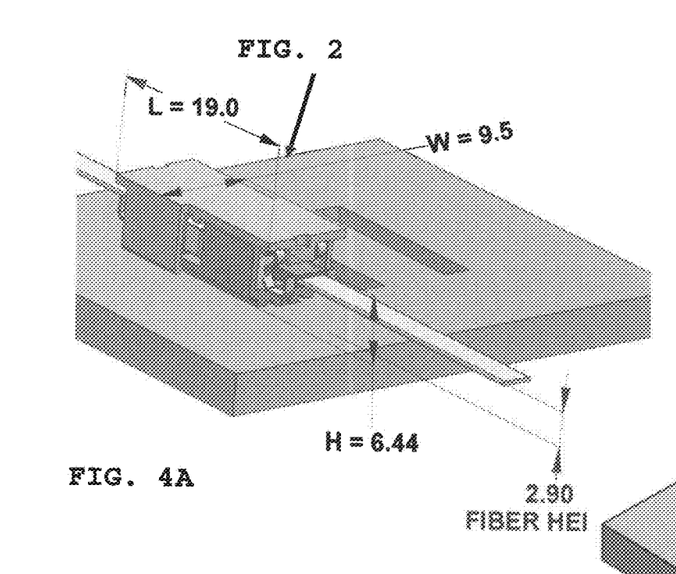
FIG. 4A depicts an assembled MT ferrule adapter of FIG. 1B secured to a PCB with dimensional units.
Figure 4B:
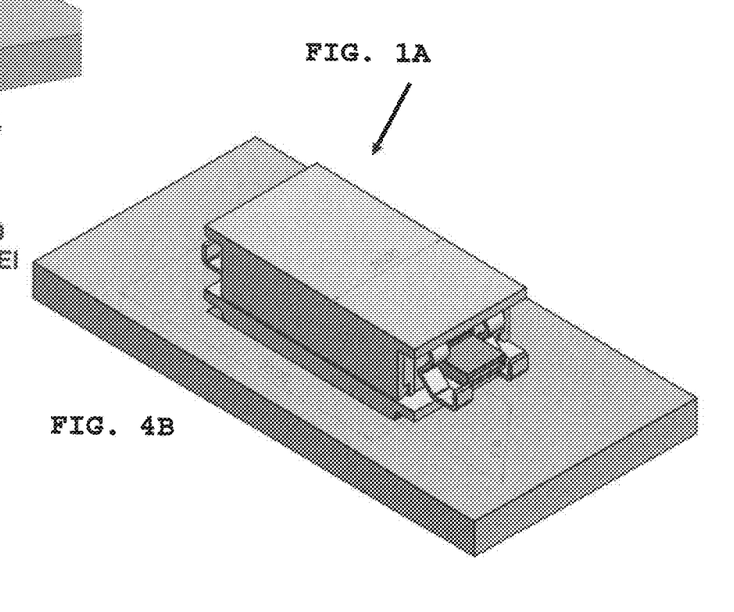
FIG. 4B depicts an assembled MT ferrule adapter of FIG. 1A secured to a PCB with dimensional units.
Figure 5:
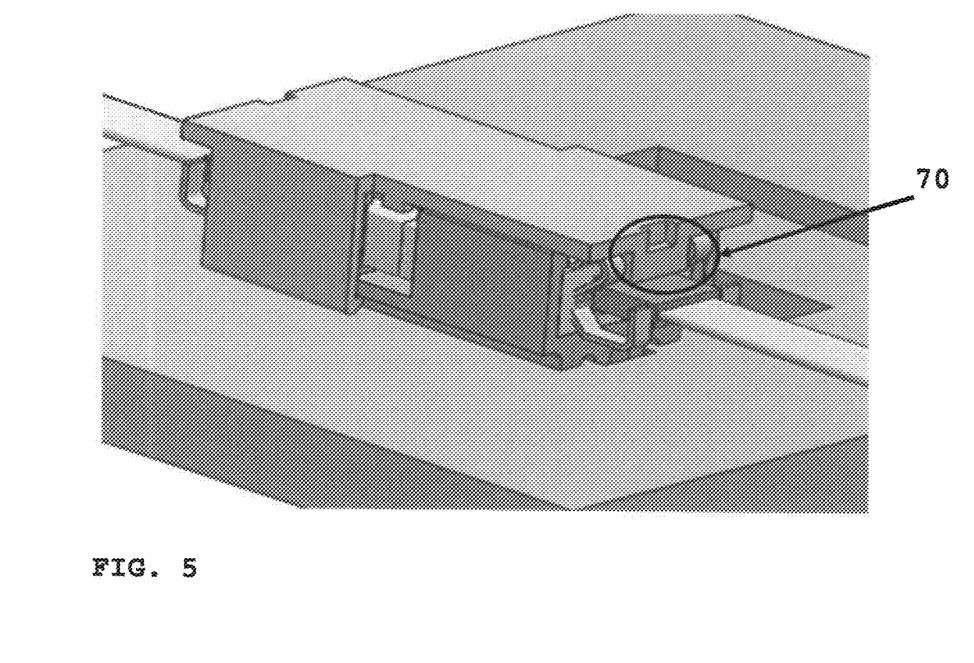
FIG. 5 depicts stacking of MT ferrule adapters.
Figure 6:
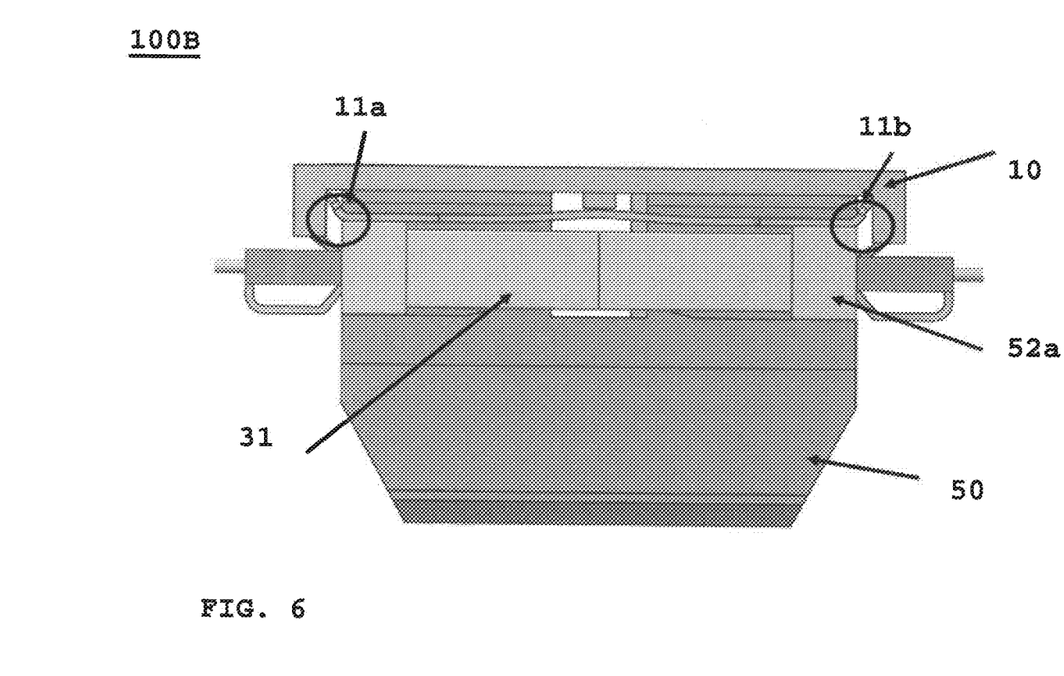
FIG. 6 is a cross-section view of MT ferrule adapter (100B).

FIG. 4A shows dimensional units of FIG. 3F. FIG. 4B shows dimensions of first embodiment (FIG. 1A) installed onto PCB (60). FIG. 5 depicts stopper (70) retaining MT Ferrule (31 or 32) within adapter housing to prevent removal. FIG. 6 is a cross-section of FIG. 5, depicting clip wing clearance (11a, 11b), and placement of MT Ferrule (21) with channel (55a). Wing clearance is about 0.50 mm.

The stacking of MT Ferrule adapters (100B) reduces space needed on PCB (60). The stacking is performed using a vertical side of ferrule adapter housing formed from upper portion (10) and bottom portion (50).

An ordinarily skilled person in the art can appreciate that by following the principal of the present invention, a version of the adapter for mating a multi-fiber optic ferrules connector with another multi-fiber optic ferrule connector can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A fiber optic adapter comprising:
an adapter housing having a base and a longitudinal axis;
a first pair of opposing retention wings extending transversely upward from the base and a second pair of opposing retention wings extending transversely upward from the base, the first pair of opposing retention wings being spaced apart from the second pair of opposing retention wings along the longitudinal axis, each of the first pair of opposing retention wings and the second pair of opposing retention wings comprising first and second retention wing elements spaced apart from one another on opposite lateral sides of the longitudinal axis;
each retention wing element having a lip protruding laterally inward toward the longitudinal axis;
the first pair of opposing retention wings defining a first channel extending laterally between the respective first and second retention wing elements below the respective lips;
the second pair of opposing retention wings defining a second channel extending laterally between the respective first and second retention wing elements below the respective lips;
a first mechanical transfer ferrule received in the first channel such that the respective lips overlie the first mechanical transfer ferrule to inhibit the first mechanical transfer ferrule from being lifted out of the first channel;
a second mechanical transfer ferrule received in the second channel such that the respective lips overlie the second mechanical transfer ferrule to inhibit the second mechanical transfer ferrule from being lifted out of the second channel; and
wherein the first mechanical transfer ferrule and the second mechanical transfer ferrule are mated;
wherein the mated mechanical transfer ferrules are aligned using a pair of guide pins on the first mechanical transfer ferrule;
wherein a retention spring clipped over the mated mechanical transfer ferrules secures the ferrules with their channel.

2. A fiber optic adapter comprising:
an adapter housing having a top portion and a bottom portion;
formed as part of the top portion are two sets of opposing retention wings along the longitudinal axis of the adapter;
each retention wing has a lip;
each pair of opposing retention wings form a channel;
a first mechanical transfer ferrule is inserted in a first channel and a second mechanical transfer ferrule is inserted in a second channel; and wherein
the first mechanical ferrule and the second mechanical ferrule are mated;
wherein the mated mechanical transfer ferrules are aligned using a pair of guide pins on the first mechanical transfer ferrule;
wherein a retention spring clipped over the mated mechanical transfer ferrules secures the ferrules with their channel.

3. The fiber optic adapter of claim 1, further comprising an upper portion secured over the retention spring.

4. The fiber optic adapter of claim 3, wherein the upper portion includes a stopper configured to further prevent movement of mated ferrules along the longitudinal axis.

5. The fiber optic adapter of claim 4, wherein the upper portion comprises a top wall having a first end portion and a second end portion spaced apart along the longitudinal axis, the stopper comprising a tab extending transversely downward from the first end portion of the top wall.

6. The fiber optic adapter of claim 5, wherein the top wall has first and second longitudinal edge margins extending longitudinally from the first end portion to the second end portion, the stopper being spaced apart laterally inboard of the first and second longitudinal edge margins such that the upper portion defines a clearance on each lateral side of the stopper for receiving a portion of the retention spring therein.

7. The fiber optic adapter of claim 3, wherein the upper portion comprises a top wall having a first end portion and a second end portion spaced apart along the longitudinal axis and first and second longitudinal edge margins extending longitudinally from the first end portion to the second end portion, the upper portion further comprising a latch element extending transversely downward from each of the first and second longitudinal edge margins and configured to latch with the adapter housing to retain the upper portion on the adapter housing.

8. The fiber optic adapter of claim 7, wherein the adapter housing comprises laterally outwardly facing latch recesses and each latch element has a laterally inwardly facing latch hook configured to latch with one or more of the latch recesses.

9. The fiber optic adapter of claim 1, wherein the adapter housing further comprises a pair of clip arms extending transversely downward from the base.

10. The fiber optic adapter of claim 9, wherein pair of clip arms are configured to snap into one or more slots of a printed circuit board to secure the adapter housing to the printed circuit board.

\* \* \* \* \*